United States Patent [19]

Stark, Jr.

[11] 4,297,457

[45] Oct. 27, 1981

[54] CURABLE EPOXY RESIN COMPOSITION

[75] Inventor: Charles J. Stark, Jr., Clifton Park, N.Y.

[73] Assignee: General Electric Company, Schenectady, N.Y.

[21] Appl. No.: 168,635

[22] Filed: Jul. 11, 1980

[51] Int. Cl.$^3$ .............................................. C08G 59/68
[52] U.S. Cl. .................................... 525/507; 525/523; 528/88; 528/92; 528/361; 528/408; 528/411
[58] Field of Search .................. 525/507, 523; 528/88, 528/92, 361, 408, 411

[56] References Cited

U.S. PATENT DOCUMENTS

| | | | |
|---|---|---|---|
| 2,962,410 | 11/1960 | Kohn | 428/371 |
| 3,776,978 | 12/1973 | Markovitz | 528/92 X |
| 3,812,214 | 5/1974 | Markovitz | 260/830 TW |

*Primary Examiner*—Earl A. Nielsen
*Attorney, Agent, or Firm*—Peter A. Bielinski; James C. Davis, Jr.; Joseph T. Cohen

[57] ABSTRACT

Aryl esters exhibit enhanced characteristics as accelerators in the cure of epoxy resins when utilized in combination with a cure initiator, such as an organic titanate or zirconate.

33 Claims, No Drawings

CURABLE EPOXY RESIN COMPOSITION

This invention is concerned with novel resinous compositions of matter, their preparation and their uses in coating compositions, liquid injection molding compounds, as casting resins for encapsulation of electronic components, pultrusion, laminates, bulk molding compounds (BMC), and in other applications where epoxy resins are normally employed for purposes now well known in the art. More particularly, the invention relates to compositions of matter comprising (1) an epoxy resin comprising a polyether derivative of a polyhydric organic compound or derivatives of glycidyl or non-glycidyl ether epoxides and (2) a titanate or zirconate curing agent or initiator and (3) an accelerator of the general formula

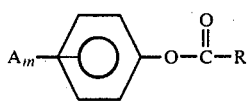

where R is independently selected from the class consisting of hydrogen, monovalent alkyl, aryl, alkaryl, aralkyl, vinyl, and allyl radicals; A is independently selected from the class consisting of hydrogen, monovalent alkyl, alkoxy, halogen, cyano, and amino radicals. The alkyl radicals, advantageously from 1 to 8 carbon atoms, include, for example, methyl, ethyl, benzyl, propyl, isopropyl, butyl, hexyl, etc. radicals. The aryl radicals include, for example, phenyl, tolyl, napthyl, etc., radicals; m is a whole number from 1 to 2, inclusive.

The cure accelerators corresponding to formula I may be prepared by reacting a phenol of the general formula

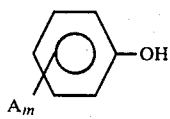

with an acid anhydride, for example, acetic anhydride, or an acid chloride in the presence of a catalyst such as concentrated sulfuric acid, or a hydrohalide acceptor such as pyridine where A and m have the meanings above.

For example, the para-chlorophenylacetate of formula I is prepared from para-chlorophenol and acetic anhydride. Examples of acyl halides which may be used to make compounds of formula I are acetyl chloride, benzyl chloride, propionyl chloride, phenol acetyl chloride, etc.

Other accelerators which can be employed in the practice of the present invention are, for example, phenyl acetate, para-bromophenylacetate, para-nitrophenylacetate, 4-chloro-3-methylphenylacetate, para-methoxyphenylacetate, para-methylphenylacetate, 2-aminophenyl propionate, 3-cyanophenylbenzoate, etc. which may be prepared from the corresponding phenolic precursors.

In U.S. Pat. No. 2,962,410 (Kohn, et al.) it is disclosed that ethoxyline resins have been cured utilizing an organic titanium ester in combination with a nitrogen containing base such as trimethylamine, dibutylamine, and derivatives of these amines, as, for instance, piperidine benzoate etc.

In U.S. Pat. No. 3,812,214 (Markovitz), it is disclosed that epoxy resins may be cured utilizing a suitable catalytic hardener such as metal acetylacetonates and a phenolic accelerator such as bisphenol-A [i.e., 2-bis(4-hydroxyphenyl) propane, catechol, resorcinol, etc.

The accelerators noted above which are useful in combination with epoxy curing agents to cure both resins have certain limitations. For example, epoxy resins cured with polyamines and polyamides are very reactive and cure very rapidly; however, the cured product normally has poor electrical properties. The utilization of phenolic accelerators such as catechols, in combination with a titanate ester initiator for the cure of epoxy resins has often been at the expense of the storage stability of such mixtures at ambient temperatures. In addition, it has been observed, when compared to the accelerators of the present invention, that the phenolic accelerators generally require a higher temperature to cure the epoxy resin and often are present in a greater concentration than that needed to cure an epoxy resin composition utilizing the aryl esters of the present invention. The test data as shown in the examples given below verify that the cure rate of epoxy resins can be varied over a wide temperature and time range depending on the type of curing initiator and aryl ester accelerator employed.

It is an object of the present invention to provide a thermosetting epoxy resin composition, the reactivity of which can be controlled over a wide range, i.e., from almost instantaneous cure to controlled cure rates coupled with the ability to cure rapidly at elevated temperatures.

It is an additional object of this invention to provide epoxy resin compositions containing cure accelerators which impart desirable physical properties, including favorable chemical resistance and electrical properties in the resultant heat-cured epoxy resin.

The term "epoxy resins" is intended to include those selected from both glycidyl and non-glycidyl ether epoxides containing more than one 1,2-epoxy group per molecule.

Such non-glycidyl ether cycloaliphatic epoxides are characterized by the absence of the ether oxygen bond, i.e., —O—, near the epoxide group, and are selected from those which contain a ring structure as well as more than one epoxide group in the molecule. The epoxide group may be part of the ring structure or may be attached to the ring structure. These epoxides may also contain ester linkages. These ester linkages are generally not near the epoxide group and are relatively unreactive, therefore these type materials are properly characterized as cycloaliphatic epoxides. These epoxides are generally prepared by epoxidizing unsaturated aliphatic hydrocarbon compounds, such as cyclic-olefins, using hydrogen peroxide or peracids such as peracetic acid and perbenzoic acid.

Other epoxy resins which may be employed in this invention such as 1,2-epoxy resins having more than one epoxy group per molecule include cycloaliphatic epoxy resins such as 3,4-epoxycyclohexylmethyl-(3,4-epoxy) cyclohexane carboxylate (sold under the trademarks ERL 4221 by Union Carbide Co. or Araldite CY 179 by Ciba Products Company), bis(3,4-epoxy 6-methylcyclohexylmethyl) adipate (sold under the trademarks ERL 4289 by Union Carbide Co. or Araldite CY 178 by Ciba Products Company), vinylcyclohexene dioxide (ERL 4206 made by Union Carbide Company), bis(2,3-epoxycyclopentyl) ether resins (sold under the trademark ERL 4205 by Union Carbide Company), 2-(3,4-epoxy)-cyclohexyl-5, and 5-spiro (3,4-epoxy)-cyclohexane-m-dioxane, (sold under the trademark Araldite CY 175 by Ciba Products Company), etc.

Glycidyl ether based epoxy resins suitable for use according to the present invention include glycidyl ethers of phenolic resins such as liquid or solid bisphenol-A diglycidyl ether epoxy resins (such as those sold under the trademarks as Epon 826, Epon 828, Epon 820, Epon 1001, Epon 1002, Epon 1004, etc., by Shell Chemical Company), phenol-formaldehyde novolac polyglycidyl ether epoxy resins (such as those sold under the trademarks DEN 431, DEN 438, and DEN 439 by Dow Chemical Company), epoxy cresol novolacs (such as those sold under trademarks ECN 1235, ECN 1273, ECN 1280 and ECN 1299 by Ciba Products Company), resorcinol glycidyl ethers (such as ERE 1359 made by Ciba Products Company), tetra-glycidyl tetraphenylethane (Epon 1031, made by Shell Chemical Company); glycidyl ether epoxy resins such as diglycidyl phthalate (ED5661 by Celanese Resins Company), diglycidyl tetrahydrophthalate (Araldite CY 182 by Ciba Products Company), and diglycidyl hexahydrophthalate (Araldite CY 183 made by Ciba Products Company); and flame retardant epoxy resins such as halogen-containing bisphenol-A diglycidyl ether epoxy resins (e.g., DER 542 and DER 511 which have bromine contents of 44-48 and 18-20%, respectively, and are made by Dow Chemical Company).

The foregoing epoxy resins are well known in the art and are set forth, for example, in many patents including U.S. Pat. Nos. 2,324,483, 2,444,333, 2,494,295, 2,500,600, and 2,511,913. The combined stabilizers and curing agents used in the practice of this invention are not only effective with various epoxy resins and mixtures of epoxy resins, but they are also effective in mixtures containing reactive and nonreactive epoxy diluents (or extenders), epoxy flexibilizers and fillers.

The curing rate of epoxy resin compositions can be tailored to cure over a time span of from five minutes to several hours based on the resin or resin mixture selected, the amount and type of curing agent and accelerator utilized in relation to the cure temperature chosen, etc. Further, blends of epoxy resins such as ERL 4221 epoxy resin/ECN 1235 epoxy cresol novolac resin, or glycidyl ether and glycidyl ester epoxy resins may be cured using the accelerators of the present invention.

The organic titanate initiators, which are added to the epoxy resin composition to initiate the cure of the epoxy resins include glycolate titanates (e.g., tetraoctylene glycol titanate containing approximately 7.8% Ti and sold under the trademark Tyzor OG by E. I. du Pont de Nemours and Company, or di-n-butyl hexylene glycol titanate), nonchelated titantes such as tetraisopropyl titanate (TPT) titanium (di-i-propoxide) bis(2,4-pentanedionate), 75% in i-propanol (Tyzor AA), tetrabutyl titanate, olymerized tetrabutyl titanate, tetrakis (2-ethylhexyl) titanate (TOT), etc. In general, the chosen titanate should be present in a concentration between 0.03 and 15%, by weight, based on the weight of the epoxy resin, with optimum cure rates generally being obtained utilizing titanate concentrations between 1 to 10%, by weight, of the epoxy resin. The amount of curing agent used will depend on such factors as type of epoxy resin used, temperature at which cure is to take place, type of curing agent and accelerator used, etc.

In place of organic titanates, organic zirconate curing agents can be added for the curing of the epoxy resins, and these include, for example, zirconium acetylacetonate, zirconium-tert-butoxide, zirconium hexafluoroacetylacetonate, zirconium naphthenate (sold by Witco Chemical Company, Incorporated), zirconium propoxide, zirconium isopropoxide (sold by Ventron Corporation), etc. The amount of zirconate curing agent can be within the same weight range as that of the titanate curing agent.

In order that those skilled in the art may better understand how the present invention may be practiced, the following examples are given by way of illustration and not by way of limitation. All parts are by weight, taking into consideration, where appropriate, the equivalent weight of the accelerator, unless otherwise indicated.

EXAMPLE 1

Tests 1-6 of Table I, provide gel or curing times for compositions utilizing accelerators herein described. Each formulation was made by mixing two epoxy resin components. Component A consists of an accelerator in an amount as shown in Table I, dissolved in 50 parts Epon 828. Component B consists of 3.8 parts Tyzor TPT (titanium tetraisopropoxide) dissolved in 50 parts Epon 828. Afterwards, the titanate solution was added to the aryl ester solution contained in a suitable vessel. This composite composition was then placed in a bath maintained at 90° C., and utilizing a Sunshine Gel Time Meter, the gel time for the composite solution was measured at 90°.

TABLE I

| Test No. | Accelerator | Parts Accelerator | Gel Time |
|---|---|---|---|
| 1 | p-Cl-$C_6H_4$OAc | 9.2 | 12.7 min |
| 2 | p-Br-$C_6H_5$OAc | 11.6 | 29.3 min |
| 3 | 4-Cl-3-$CH_3$—$C_6H_3$OAc | 9.9 | 43.4 min |
| 4 | $C_6H_5$OAc | 7.3 | 271.0 min |
| 5 | p-$CH_3$O—$C_6H_4$OAc | 8.9 | 402.8 min |
| 6 | p-$CH_3$—$C_6H_4$OAc | 8.1 | 910.4 min |

EXAMPLE 2

Tests 7-12 of Table II show gel time tests conducted in the same manner as described for the compositions in Table I except that the corresponding phenols replaced the aryl esters as accelerators.

TABLE II

| Test No. | Accelerator | Parts Accelerator | Gel Time |
|---|---|---|---|
| 7 | p-Cl-$C_6H_4$OH | 6.9 | 43.3 min |
| 8 | p-Br-$C_6H_5$OH | 9.3 | 44.2 min |
| 9 | 4Cl-3-$CH_3$—$C_6H_4$OH | 7.7 | 55.4 min |
| 10 | $C_6H_5$OH | 5.1 | 558.0 min |
| 11 | p-$OCH_3$—$C_6H_4$OH | 6.7 | 943.6 min |
| 12 | p-$CH_3$—$C_6H_4$OH | 5.8 | 995.3 min |

EXAMPLE 3

Tests 13-16, of Table III show gel time tests conducted according to the procedure of Tests 1-6 of Table I, using the same procedures therein described but using instead either Tyzor AA or Tyzor OG, and employing a temperature of 130° C. for determining time of gelation.

TABLE III

| Test No. | Tyzor | Accelerator | Parts Accelerator | Gel Time |
|---|---|---|---|---|
| 13 | OG | p-Cl-C₆H₄OAc | 9.2 | 218.3 min |
| 14 | AA | p-CL—C₆H₄OAc | 9.2 | 256.9 min |
| 15 | OG | p-Cl-C₆H₄OH | 6.9 | 876.2 min |
| 16 | AA | p-Cl-C₆H₄OH | 6.9 | 323.6 min |

EXAMPLE 3

Tests 17–22 of Table IV show the heat deflection temperatures (HDT) in °C. for tests run on resin-titanate and resin-accelerator solutions prepared as described for the test components of Table I. The solutions of tests 17–22 were mixed at room temperature and poured into a mold. The mold was then placed in a 150° C. oven, where it was maintained for 24 hours. Subsequently, the mold was removed and disassembled. Molded parts are obtained, which were machined to produce samples of 4.75″×0.5″×0.25″ for measuring heat deflection temperatures. The temperatures required to produce a 10 mil deflection under 264 psi were measured and recorded as indicated in Table IV.

TABLE IV

| Test No. | Tyzor | Accelerator | Parts Accelerator | HDT (°C.) |
|---|---|---|---|---|
| 17 | TPT | p-Cl-C₆H₄OAc | 9.2 | 105.0 |
| 18 | TPT | p-Br-C₆H₄OAc | 11.6 | 111.0 |
| 19 | TPT | 4-Cl-3-CH₃—C₆H₃OAc | 9.9 | 97.2 |
| 20 | TPT | p-Cl-C₆H₄OH | 6.9 | 109.0 |
| 21 | TPT | p-Br-C₆H₄OH | 9.3 | 112.0 |
| 22 | TPT | 4-Cl-3-CH₃—C₆H₃OH | 7.7 | 111.6 |

It will be appreciated from the above that no detrimental effects are experienced in the HDT for the acetate derived accelerators as contrasted to the corresponding substituted phenols.

While other modifications of the invention and variations thereof which may be employed within the scope of the invention have not been described, the invention is intended to include such as may be embraced within the following claims:

What I claim as new and desire to secure by Letters Patent of the United States is:

1. A composition of matter comprising an epoxy resin, a cure initiator, and an accelerator of the general formula

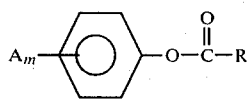

where R is independently selected from the class consisting of hydrogen, monovalent alkyl, aryl, alkaryl, aralkyl, vinyl and allyl radicals; A is independently selected from the class consisting of hydrogen, monovalent alkyl, alkoxy, halogen, cyano and amino radicals, and m is a whole number from 1 to 2, inclusive.

2. A composition of matter as in claim 1, wherein the cure initiator is a titanium or zirconium ester.

3. A composition of matter as in claim 1, wherein the accelerator has the formula

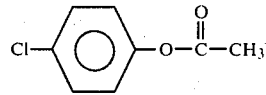

4. A composition of matter as in claim 1, wherein the accelerator has the formula

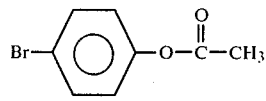

5. A composition of matter as in claim 1, wherein the accelerator has the formula

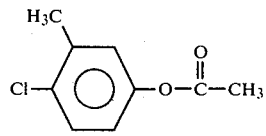

6. A composition of matter as in claim 1, wherein the accelerator has the formula

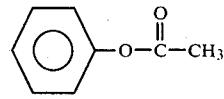

7. A composition of matter as in claim 1, wherein the cure initiator is a titanium ester and the accelerator has the general formula

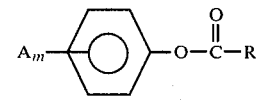

where R is independently selected from the class consisting of hydrogen, monovalent alkyl, aryl, alkaryl, aralkyl and allyl radicals; A is independently selected from the class consisting of hydrogen, monovalent alkyl, alkoxy, halogen, cyano and amino radicals.

8. A composition of matter as in claim 1, wherein the cure initiator is a zirconium ester and the accelerator has the general formula

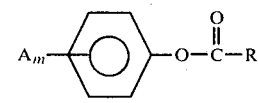

where R is independently selected from the class consisting of hydrogen, monovalent alkyl, aryl, alkaryl, aralkyl and allyl radicals; A is independently selected from the class consisting of hydrogen, monovalent alkyl, alkoxy, halogen, cyano and amino radicals.

9. A composition of matter as in claim 1 wherein the cure initiator is a titanate ester and the accelerator is a compound of the formula

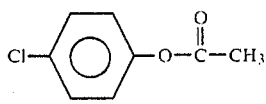

10. A composition of matter as in claim 1 wherein the cure initiator is a titanate ester and the accelerator is a compound of the formula

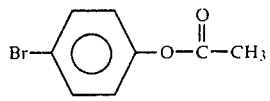

11. A composition of matter as in claim 1 wherein the cure initiator is a titanate ester and the accelerator is a compound of the formula

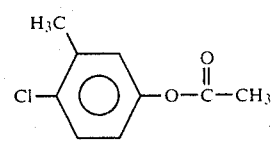

12. A composition of matter as in claim 1, wherein the cure initiator is a titanate ester and the accelerator is a compound of the formula

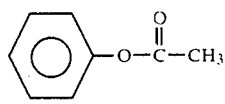

13. A composition of matter as in claim 1, wherein the cure initiator is a zirconate ester and the accelerator is a compound of the formula

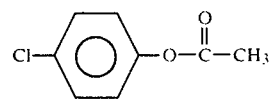

14. A composition of matter as in claim 1 wherein the cure initiator is a zirconate ester and the accelerator is a compound of the formula

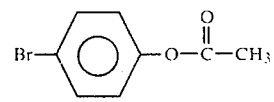

15. A composition of matter as in claim 1 wherein the cure initiator is a zirconate ester and the accelerator is a compound of the formula

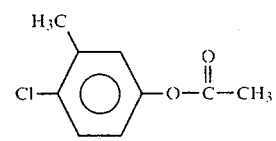

16. A method for curing an epoxy resin which comprises (1) forming a mixture of ingredients comprising an epoxy resin and a cure initiator; (2) forming a second mixture of ingredients comprising an epoxy resin and an accelerator selected from the class consisting of compounds of the general formula

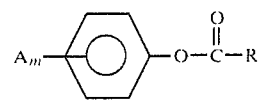

where R is independently selected from the class consisting of hydrogen, monovalent alkyl, aryl, alkaryl, aralkyl and allyl radicals; A is independently selected from the class consisting of hydrogen, monovalent alkyl, alkoxy, halogen, cyano and amino radicals, (3) combining the aforesaid mixtures of ingredients, and (4) heating the aforesaid combined mixtures of ingredients at a temperature and for a time sufficient to effect curing of said epoxy resin.

17. A method for curing an epoxy resin according to claim 16 wherein the cure initiator is a titanium ester.

18. A method for curing an epoxy resin according to claim 16 wherein the cure initiator is a zirconium ester.

19. A method for curing an epoxy resin according to claim 16 wherein the accelerator is a compound of the formula

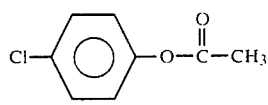

20. A method for curing an epoxy resin according to claim 16 wherein the accelerator is a compound of the formula

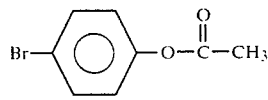

21. A method for curing an epoxy resin according to claim 16 wherein the accelerator is a compound of the formula

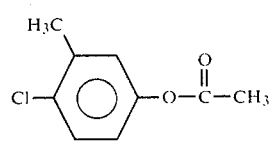

22. A method for curing an epoxy resin according to claim 16 wherein the accelerator is a compound of the formula

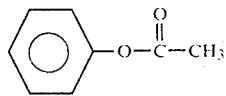

23. The heat cured product of claim 1.
24. The heat cured product of claim 2.
25. The heat cured product of claim 7.
26. The heat cured product of claim 8.
27. The heat cured product of claim 9.
28. The heat cured product of claim 10.
29. The heat cured product of claim 11.
30. The heat cured product of claim 12.
31. The heat cured product of claim 13.
32. The heat cured product of claim 14.
33. The heat cured product of claim 15.

* * * * *